United States Patent [19]

Favvas

[11] Patent Number: 4,777,731

[45] Date of Patent: Oct. 18, 1988

[54] TAPER-MEASURING DEVICE AND METHOD

[76] Inventor: Dimitrios Favvas, 625, 41st Avenue, Lasalle, Canada, H8P 3B1

[21] Appl. No.: 126,782

[22] Filed: Nov. 30, 1987

[51] Int. Cl.⁴ ............................................. G01B 5/24
[52] U.S. Cl. .................................... 33/531; 33/168 R
[58] Field of Search ............ 33/536, 531, 532, 178 B, 33/168 R

[56] References Cited

U.S. PATENT DOCUMENTS

| | | | |
|---|---|---|---|
| 1,179,551 | 4/1916 | Muller | 33/536 |
| 1,225,315 | 5/1917 | Conrad | 33/168 R |
| 2,494,715 | 1/1950 | Mathews | 33/536 |
| 2,635,346 | 4/1953 | Muench. | |
| 2,645,026 | 7/1953 | Trbojevich. | |
| 4,389,785 | 6/1983 | Goldsmith et al. | |

FOREIGN PATENT DOCUMENTS 1145539  3/1983  Canada.

Primary Examiner—Harry N. Haroian

[57] ABSTRACT

The measuring bar consists of an elongated rigid sectional shaft to the ends of which are secured two identical diametrically larger spherical bodies. Adjacent and inwardly of each body, there is provided a pair of stabilizer discs eccentrically connected to the shaft about a transverse axis. These stabilizer discs impart lateral stability to the measuring bar when both spherical bodies rest on a curved or flat surface. The spherical bodies are of precisely-known diameter d and the distance $L_a$ between their centers is also precisely known. The method of measuring, for instance, the taper of a conical shaft includes the following steps: (a) positioning the measuring bar on the shaft with its longitudinal axis co-planar with the shaft axis; (b) measuring at a first spherical body the shortest distance $S_a$ between a point of the shaft opposite the body and co-planar with the axes of the measuring bar and of the shaft and a tangent of the first body whereby the latter distance is measured along a line which is normal to the cone generatrix containing this point; (c) repeating the measuring step (b) at the second body to obtain the distance Sb; and (d) computing the tapering angle $\theta$ from $L_a$, $S_a$ and $S_b$ by resolving the following equation:

$$\theta = \text{sine}^{-1} \frac{S_b - S_a}{L_a}.$$

11 Claims, 3 Drawing Sheets

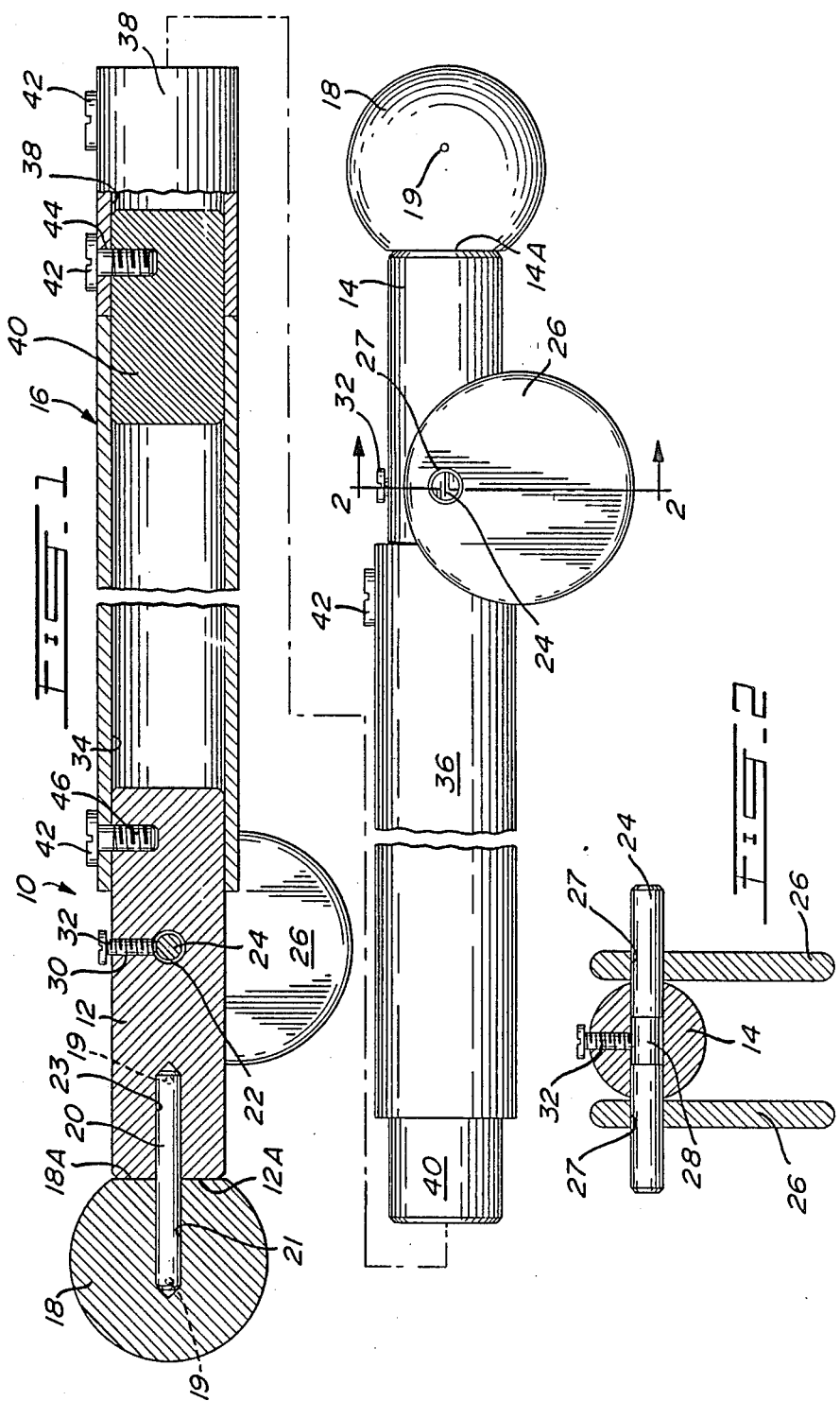

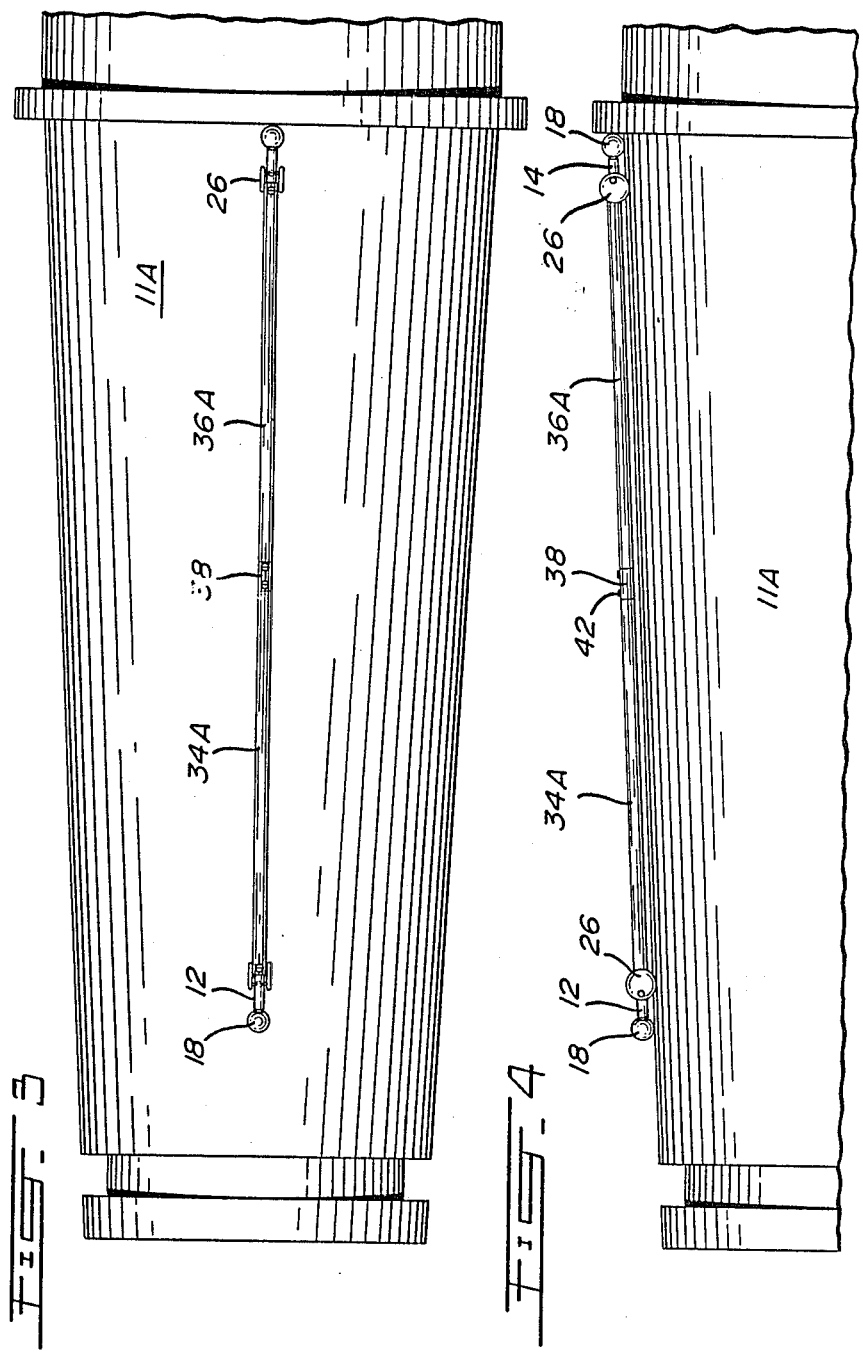

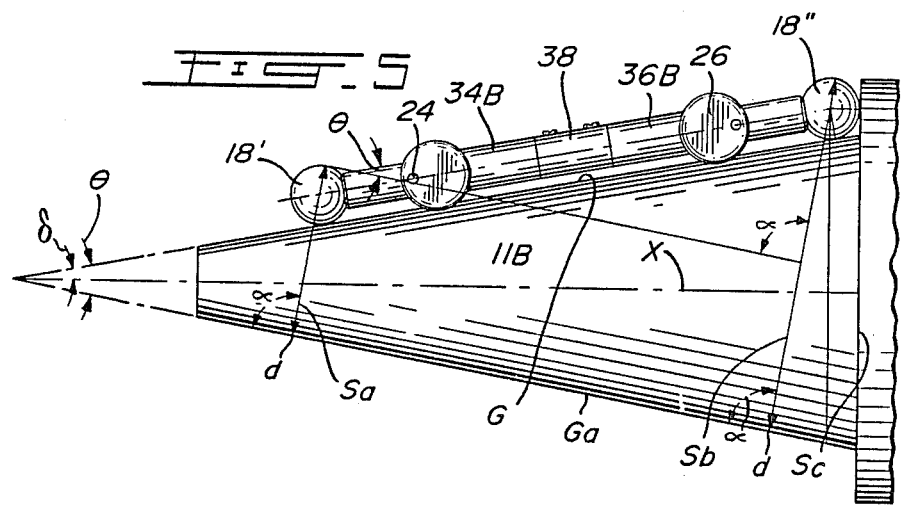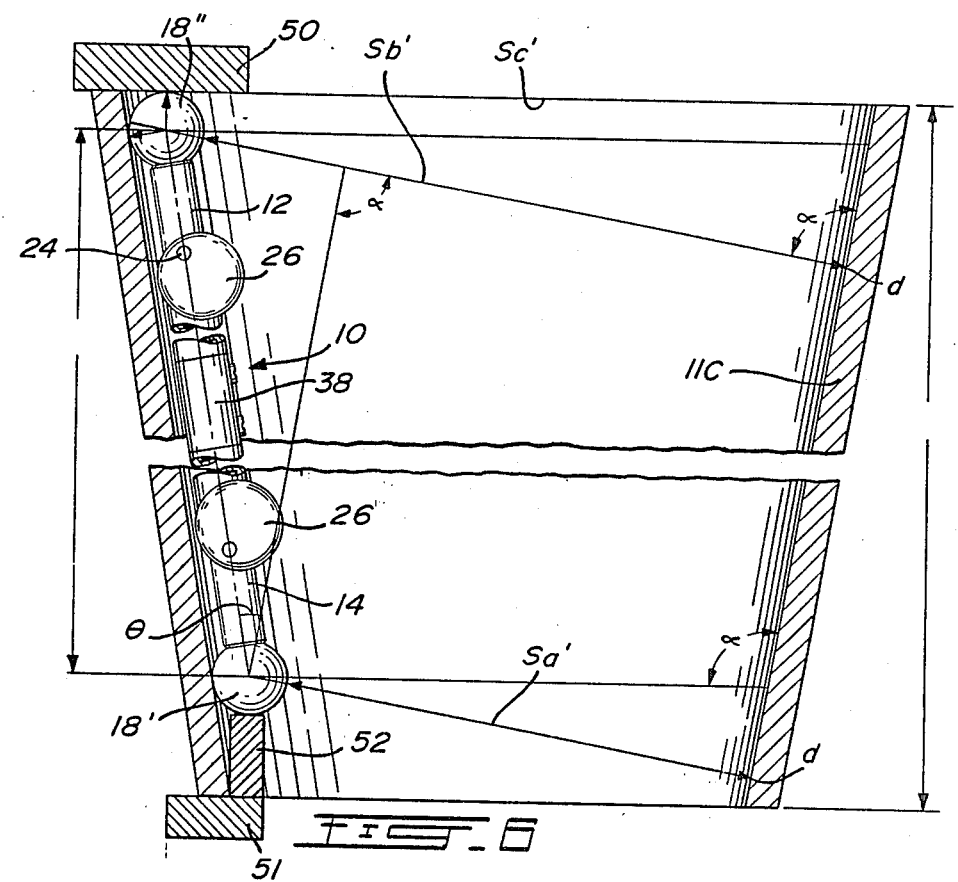

TAPER-MEASURING DEVICE AND METHOD

FIELD OF THE INVENTION

This invention relates to measuring bars, and more particularly to a measuring bar specifically constructed for measuring the tapering of a conic structure. The invention is also directed to the method of measuring this tapering.

BACKGROUND OF THE INVENTION

The measure of the tapering of a large conic structure has always been made in the past substantially by approximations, i.e. not in a scientific manner. This, of course, constitutes a considerable limitation on the accuracy of the dimensions of manufactured tapering structures, and especially for structures pierced by a conic bore, the latter being conventionally the most difficult to measure and, thus, to manufacture. Expensive gages and gages ground to a specific shape, are now used to set the boring machine. Then a ball micrometer is used to measure the diameter at the larger end of the taper; but the level of precision of the measures is quite low. This is why supplemental strenuous work has to be done, usually by hand.

Mechanic blue is applied on the tapered end part of a large diameter shaft, and the end part is tried in the tapered bore of a wheel or the like for verifying contact therewith. If contact is not up to expectations, the bore surface must be scraped or manually finished, and the process is repeated until the required contacting relation is obtained. Such a process is labor intensive since it may take up to a couple of weeks to obtain a satisfactory result.

When measures of precision are to be taken in view of a final value, it is the intermediate measurement having the lowest level of precision that constitutes the bottleneck of the accuracy of the final value. For example, if a final value A is to be determined by finding the value of variables B, C, and D, whereby $A = B + C + D$, with B being precise to 0.01 unit, C to 0.001 unit, and D to 0.0001 unit, then A will be precise only to up to the level of precision of the value B, i.e. to 0.01 unit.

A sine bar is a device for assisting in the measure of the slope of a structure having an inclined surface, through computations made accordingly with trigonometric laws. It is normally used by quality control inspectors in machine shops, tool rooms and the like, for finding and checking angles, measuring angles and tapers to determine center distances, etc . . . . The sine bar is usually made of two round discs fastened to a main intermediate steel bar. A sine bar comes normally at a single standard length, which is usually a five- or ten-inch length.

A set of various gage-blocks, of precisely-known dimensions, is provided with conventional sine bars, and a number thereof have to be alternately selected empirically to constitute two spaced "columns" of different height, thus making a virtual slope accordingly with the slope of the said structure-inclined surface. The sine bar is used cooperatively with these two columns of gage-blocks, with one disc supported by the smaller column and the other disc supported by the higher column. The gage-blocks are required in this process, because only limited sections of the sine bar disc can be utilized in setting up for angular work in connection with the usual angle plates and, therefore, the sine bar disc could not be used directly on the structure surface, the slope of which is to be measured.

It is also customary to supplement sine bar operation with said gage-blocks, with further direct reading on the barrel of a micrometer that adjusts the relative height with angular minutes of precision. A micrometer usually consists of two elements; a barrel and a thimble, the barrel operating in a screw having a large number of threads per inch, so that one turn moves the barrel and thimble a corresponding fraction of an inch.

When measuring the diameter of a given section of a cone member, a pair of inturned micrometers are usually provided at the two ends of a semi-circular or C-shaped compass-like member, wherein a given length or height is determined by the distance between the two micrometers. Inversely, when measuring the diameter of a given section of a conic bore in a bored structure, two out-turned micrometers are usually provided at the two outer ends of a straight rod-like member. The difficulty resides in the precise measure of the taper of such cone member or conic bore; as for now, the value thereof is obtained with poor accuracy and is at best approximate. Thus, the level of precision of the measure is low. Accordingly, cone members and members having conic bores cannot be manufactured beyond intermediate-to-low tolerance levels.

OBJECTS OF THE INVENTION

The main object of the invention is to provide a universal taper-measuring instrument which is used to measure the taper of any tapered structure, such as conic bore, a conical turbine shaft including its keyway, etc . . . .

A further object of the invention is to provide a method for computing the tapering angle of a tapered structure.

Still another object of the invention is that the above measuring device is used for measuring the taper of large parts where the use of a sine bar with precision gage-blocks is impossible.

Another object of the above-mentioned sine bar of the invention is that it is available in a wide variety of lengths in accordance with the slope of the structure surfaces to be measured.

An object of the above invention is that it is economical in manufacturing costs.

SUMMARY OF THE INVENTION

The measuring bar of the invention comprises a pair of spherical bodies of identical diameter interconnected by a rod-like bar made in sections and of smaller diameter than the diameter of the spherical bodies. Adjacent each spherical body and inwardly thereof, there is provided a pair of stabilizer discs disposed on each side of the bar and rigidly and eccentrically secured to a pivot rod which is journalled within and transversely of the main bar. Locking means serve to lock the stabilizer discs in an adjusted angular orientation. The stabilizer discs are adapted to contact the same surface as the spherical bodies and laterally stabilize the ends of the measuring bar whether the surface is transversely curved or flat.

There is also disclosed a method of measuring the tapering angle $\theta$ of two equally converging surfaces with respect to a first axis and using the measuring bar above-defined. At least the second one of said surfaces must be transversely convex. The method comprises the steps of positioning the measuring bar on a first surface with the spherical bodies along an axis co-planar with said first axis, then measuring at a first spherical body the shortest distance $S_a$ between a point of the second surface co-planar with the axis of the measuring bar and the first axis at a tangent of the spherical body whereby the distance $S_a$ is measured along a line which is normal to the second surface; repeating the above-mentioned measuring steps at the second spherical body to obtain the distance $S_b$ and finally computing the tapering angle 74 from $L_a$, $S_a$, and $S_b$, $L_a$ being the distance between the centers of the two spherical bodies of the measuring bar.

The method is applicable to a conical shaft or bore. It is noted that the measuring method can be accomplished while positioning the measuring bar in the flat bottom surface of a keyway of a conical shaft. It should also be noted that the distance $L_a$ between the center of the two spherical bodies can be derived by measuring the distance along the center line of the shaft or bore and projecting this distance at right angles to said center line onto the centers of the spherical bodies. Such a case would be applicable when the two spherical bodies are not interconnected by a bar or rod.

The measuring method of the invention is made possible by the fact that the above-mentioned point is unique and can be easily located when using a micrometer compass device.

BRIEF DESCRIPTION OF THE DRAWINGS

FIG. 1 is an exploded partly-sectional elevation of the measuring bar according to the invention;

FIG. 2 is a cross-sectional view taken along line 2—2 of FIG. 1;

FIG. 3 is a top plan view of a conical shaft and of a freely-standing measuring bar in accordance with the invention;

FIG. 4 is a fragmentary elevation of said conical shaft supporting said measuring bar;

FIG. 5 is an elevation of another more tapered shaft and of the shortened measuring bar; and FIG. 6 is an enlarged partly-broken longitudinal sectional view of a structure with a conical bore showing how the measuring bar, shown partly broken for clarity, is used to measure an inside taper.

DETAILED DESCRIPTION OF THE EMBODIMENT OF THE INVENTION

The measuring bar is clearly shown at 10 in FIGS. 1-2, as constructed in accordance with the teachings of the invention. Measuring bar 10 is designed for use with large conical bodies, or tapered circular solid or hollow bodies 11A, 11B, 11C, shown in FIGS. 3 to 6. In FIGS. 1-2, measuring bar 10 consists of a pair of similar opposite cylindrical rods 12, 14, being interconnected by an extension member 16 detailed later. To the outer ends of rod 12, 14, is fixedly secured a generally spherical solid body or ball 18. More particularly, ball 18 includes a flat face 18A, of a diameter substantially that of the rods 12, 14 forming a seat against which abuts the flat ends 12A, 14A, respectively of rods 12, 14. A dowel pin 20, having bevelled ends is fitted into radial bore 21 and axial bore 23 in ball 18 and in rods 12, 14, respectively, to interconnect the corresponding pair of same. Preferably, pin 20 is shrink-fitted in the bores of rods 12, 14 and of ball 18.

Each ball 18 includes a small transverse bore 19 opening into the corresponding end of radial pin bore 21 or rod pin bore 23. Bores 19 allow air to escape therethrough for facilitating engagement of pin 20 into these bores 21 and 23.

Each rod 12, 14 is transversely diametrically bored at its intermediate section at 22, at right angles to the axis of pin 20, and a pivot rod 24 is journalled in each bore 22. Each rod 24 protrudes from rod 12, 14 and is press-fitted into an eccentric bore 27 of a pair of equally oriented opposite discs 26, which are adjacent the opposite sides of rod 12 or 14. Discs 26 are diametrally larger than balls 18 and are of identical diameter. The intermediate portion of rods 24 is diametrally smaller at 28, and each rod 12, 14 further includes a transverse radial theaded tubular cavity 30 at right angle to bore 27 and opening thereinto and threadedly engaged by flat head screw 32. Thus, screw 32 is abuttable against diametrally smaller rod portion or seat 28 to constitute a set screw. When set screw 32 is released or unscrewed, rod 24 may be manually rotated, which still bring both corresponding discs 26 in concurrent rotation therewith; because of the eccentricity of bore 27, when discs 26 rotate, the horizontal plane passing through the instantaneous bottom peripheral (tangential) edge will be vertically reciprocating from a lowermost limit position, shown in FIGS. 1-2, to an uppermost limit position a full half-turn relative to its lowermost limit.

The dimensions of structures 12 and 14, 18, and 26 are related. Indeed, the bottom tangential edge of ball 18 should define a horizontal plane intermediate the horizontal planes passing through the bottom tangential edges of the discs at their sequential uppermost and lower-most limit positions. As suggested by FIG. 2 (it should be inverted to clearly understand the following) at the uppermost limit position of discs 26, their tangential bottom edges may define a horizontal plane passing through the tangential bottom edge of the corresponding rod 12 or 14; this is not essential; but, obviously, any higher level of the disc tangential bottom edge would be useless, since the surface of the object on which measuring bar 10 would stand would then abut against the bottom tangential edge of the rod 12 or 14. Discs 26 should be at least twice as large diametrally as full cylinders 12 or 14.

Most importantly, the dimensions of each ball 18 is very precisely known, say up to 0.0001 of an inch, accordingly with well-known manufacturing methods which need not be detailed here.

Moreover, as clearly shown in FIGS. 2 and 3 of the drawings, since balls 18 are coaxial to the common axis of rods 12, 14, the bottom tangential edges of the two balls 18 define a horizontal axis intermediate that of each pair of lengthwisely-opposite discs 26 on one side of rods 12, 14, and that of the other pair of lengthwisely-opposite discs 26 on the other side.

When the measuring bar 10 is put on the top edge portion of the tapered circular body 11A, 11B, 11C, the set screw 32 should be released to pivot rod 24 to rotate discs 26 upwardly, whereby the two balls 18 alone would abut against the surface of these bodies. After, the rod 24 should be counterrotated very slowly, until just before the bottom tangential edges of the discs 26 rotating therewith begin to abut against the vertically-registering surface portion of the larger cone or tapered cylindrical body 11A, 11B, 11C. Set screw 32 is then screwed to lock rod 24. Thereafter, it is obvious that, due to the conical shape of these bodies 11A, 11B, 11C, the transverse section thereof in register with discs 26 is arcuate, whereby the disc tangential bottom edges are at a lower level than the bottom tangential edge of balls 18. Hence, the discs form transverse support legs to stabilize measuring bar 10 and to prevent it from falling sideways of the body.

In operation, the measuring bar 10 is normally retained in position by magnetic clamps, while taper measurements are taken.

An extension member 16 shown in FIG. 1 consists of two main hollow cylindrical tubes 34, 36, which are identical to one another, and of a third short connector tube 38 intermediate tubes 34 and 36. More particularly, each tube 34, 36 is frictionally engageable at its outer end by corresponding solid rods 12 or 14, and a cylindrical tenon 40 is frictionally fitted into the inner end of each tube 34, 36. Both tenons 40 are in turn frictionally engageable at the opposite ends of intermediate connector tube 38. Flat-head screws 42 releasably interconnect the outer ends of tubes 34, 36 to the inner ends of rods 12, 14. Two other screws 42 releasably interconnect connector tube 38 to the outer ends of both tenons 40. Each screw 42 is engageable into a corresponding smooth bore 44 on the top surface of corresponding tube 34, 36 or 38, and into a threaded transverse tubular cavity 46 made on one side of rods 12 or 14, or either one of the two tenons 40. Screws 42 are larger than set screws 32 and all the screws 32, 42 are advantageously colinearly positioned.

Hence, it is now understood that tubes 34, 36 can be replaced by a number of different pairs of other similar tubes but of different length, as shown at 34A, 36A in FIGS. 3, 4 and at 34B, 36B in FIG. 5. Tubes 34, 36 can also be entirely discarded and connector tube 38 directly connected to end rods 12, 14, or only one tube 34, 36 can be used. Therefore, the length of the measuring bar 10 can be varied depending on the length and slope of the tapering circular body on which the measuring bar 10 is to be positioned for determining the precise angle of taper thereof; the steeper the tapering of the body, the shorter the length of the measuring bar, and vice versa. Thus, the plurality of gage-blocks of different dimensions used in the prior art are no more needed, since the length of the measuring bar accordingly with the invention is incrementally variable, contrarily with the conventional fixed standard length of measuring bars.

For instance, in FIGS. 3, 4, a shaft 11A, of tapering shape, is shown. The angle of taper of shaft 11A is, by inspection, very small, probably not more than a few degree of angle. If one is to measure with high precision the angle of taper thereof, using trigonometric computations disclosed hereinbelow, the difference in height between the two balls 18 at the opposite ends of the measuring bar 10 corresponding to the small side of a virtual right triangle used in the trigonometric computations, must be sufficiently long, so that the number of significant decimals of the degrees of angle be up to the desired level. Thus, the extension tubes 34A, 36A of the bar need to be quite long, as illustrated.

In FIG. 5, the shaft illustrated, 11B, is steeply tapered and, accordingly, the bar used to measure its angle of taper must be shorter, in order not to extend beyond the shaft; extension tubes 34B, 36B should be accordingly quite short, as illustrated.

FIG. 6 shows that the bar 10 can be used to calculate the angle of the taper of a conical bore of a tapered body 11C. In this case, the bar 10 must be positioned against the inner face of the body 11C.

Referring to FIG. 5, the measuring bar is positioned on the conical surface 11B of a shaft having a longitudinal axis indicated X, the measuring bar is positioned with the centers of the two spherical bodies 18', 18'' co-planar with axis X along a cone generatrix line G. Using a C-shaped micrometric compass device (not shown), the distances $S_a$ and $S_b$ are subsequently measured; these distances are taken from the top of the respective bodies 18', 18'' to a point d along a cone generatrix line Ga which is diametrically opposite generatrix line G, that is, which is co-planar with the axis of measuring bar 10 and with cone axis X. Point d is selected such that lines $S_a$, $S_b$ are at a right angle $\alpha$ to generatrix line Ga.

It will be noted that the two points d are unique as they are defined by a minimum distance from the top of the spherical bodies when swinging the compass device in the plane of axis X and of the axis of the measuring bar while the distance $S_a$ and $S_b$ are a maximum in the planes transverse to the above-noted plane.

The bar is maintained in position across the step $S_c$ of the shaft by suitable magnetic clamps (not shown) and of conventional construction.

In the case of body 11B, the angle of taper $\theta$ can be shown to be:

$$\theta = \sin^{-1} \frac{S_b - S_a}{L_a}$$

where $\theta$ is the tapering angle; $S_b$ is the length of the virtual straight segment passing through the center of spherical body 18'' and extending from the tangent at the top of said spherical body to the bottom generatrix line Ga orthogonally thereof; $S_a$ is the equivalent straight segment for ball 18'; and $L_a$ is the distance between the centers of the two spherical bodies 18', and 18''.

It can be derived that the taper per unit length is equal to:

$$2 \tan \delta = 2 \tan \frac{\theta}{2}.$$

The largest diameter $S_c$ of the conical portion 11B of the shaft can also be derived with the ball 18'' pressed against the shoulder $S_c$ as shown in FIG. 5:

$$S_c = \frac{S_b - d}{\cos \delta} + d \tan \delta,$$

where $\delta$ is half the angle $\theta$ and d is the diameter of any one of the spherical bodies 18' or 18''.

Referring to FIG. 6, it can be seen that a similar method is used for measuring the tapering angle $\theta$ of a conical bore with the measuring bar applied to the conical surface of the bore, also with its longitudinal axis in the plane of the longitudinal axis of the conical surface, the measuring bar indicated at 10 being maintained in position by magnetic blocks 50, 51 and gauge block 52, and also, if necessary, by magnetic clamps (not shown) along the length of the bar. The distances $S_a'$, $S_b'$ are measured with a micrometric measuring device with external micrometric points, the distances being measured in accordance with the arrows at the ends of the lines $S_a'$ and $S_b'$. The distance $S_c'$ can be measured by the following equation:

$$S_c' = \frac{S_b' + d}{\cos \delta} + d \tan \delta.$$

What I claim is:

1. A measuring instrument used in the measure of the taper of two converging surfaces comprising a pair of spherical bodies of equal diameters, an elongated sectional connector arm rigidly interconnecting said two spherical bodies and of a crosssectional profile smaller than the diameter of said bodies, a transverse pivot rod journalled in the connector arm and projecting therefrom transversely thereof at each end of said connector arm adjacent to and inwardly of the respective spherical bodies and a pair of disc-like stabilizer members eccentrically fixed to the respective ends of said pivot rod and each having the same angular orientation, said stabilizer discs being provided for imparting lateral stability to the measuring instrument when said spherical bodies rest on a transversely flat or curved surface with the two disc-like stabilizer members and the spherical body at each end of the measuring instrument forming a three-point contact with said surface and further including means to lock said pivot rod in any rotated position.

2. A measuring instrument as defined in claim 1, wherein each spherical body has a peripheral flat face portion and said connector arm has flat end faces in abutment with the flat face portions of the spherical bodies and dowel pins interconnecting the spherical bodies to the connector arm, said dowel pins permanently engaged into a radial bore of each of said spherical bodies and into a central axis bore in the corresponding end of said arm.

3. A measuring instrument as defined in claim 2, further including a radial venting bore in communication with said radial bore and with said central axis bore and opening to the exterior of the spherical body and of the arm to allow air venting to facilitate engagement of said dowel pin into said radial bore and said central axis bore respectively.

4. A measuring instrument as defined in claim 1, wherein said pivot rod has a central portion of decreased diameter and said locking means include a set screw threaded in said arm and engaging said reduced diameter central portion.

5. A measuring instrument as defined in claim 1, wherein each disc-like stabilizer member has a diameter which is greater than that of said spherical bodies.

6. A measuring instrument as defined in claim 1, wherein said connector arm includes a series of releasably inter-fitted tubular members and solid rod-like members telescopically engaging said tubular members and means to maintain the same at fixed axial positions relative to one another.

7. A method of measuring the tapering angle $\theta$ of first and second surfaces equally converging relative to a given first axis, said surfaces being surface portions of a single large work piece and disposed on opposite sides of said first axis, at least said second surface being transversely curved, comprising the steps of:

(a) positioning a first and second spherical body of known and equal diameters on said first surface with their centers at a known fixed distance $L_a$ from each other along a second axis co-planar with said first axis;

(b) contacting said first spherical body with one end of a micrometric measuring instrument and swinging the other end of said measuring instrument both in the plane containing said first and second axes and transversely of said plane, while contacting the other end of said instrument with said second surface to thus measure at said first spherical body the shortest distance $S_a$ between a point of said second surface co-planar with said first and second axes and a tangent of said first spherical body, whereby said distance $S_a$ is measured along a line which is normal to said second surface;

(c) repeating the measuring step (b) at said second spherical body to obtain an analogous shortest distance $S_b$; and (d) computing the tapering angle $\theta$ from the value $L_a$, $S_a$, $S_b$.

8. A measuring method as defined in claim 7, wherein said surfaces are diametrically opposite portions of a conical surface of revolution defined by said work piece.

9. A measuring method as defined in claim 8, wherein said surfaces are diametrically opposite portions of the external surface of a conical portion of said work piece.

10. A measuring method as defined in claim 8, wherein said surfaces are the diametrically opposite portions of the internal surface of a conical bore made in work piece.

11. A measuring method as defined in claim 8, wherein said second surface is a portion of the external surface of a conical portion of said work piece and said first surface is the flat surface of a keyway made in the external surface of said conical portion.

* * * * *